(No Model.)
N. A. GRIFFITH.
JOURNAL BEARING.
No. 258,413. Patented May 23, 1882.
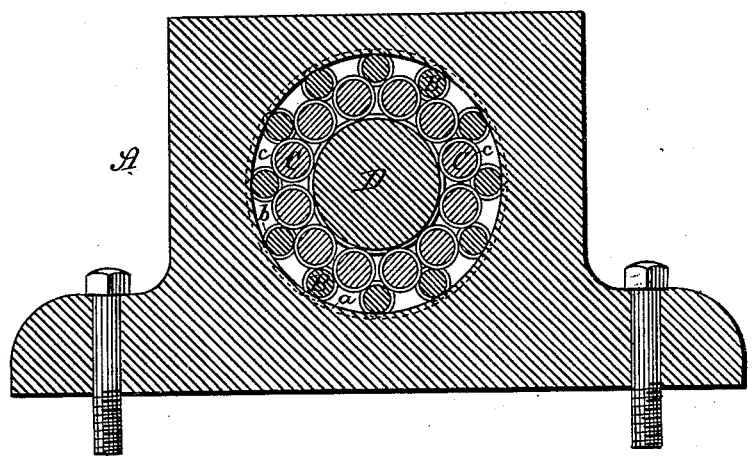
Fig. 1.
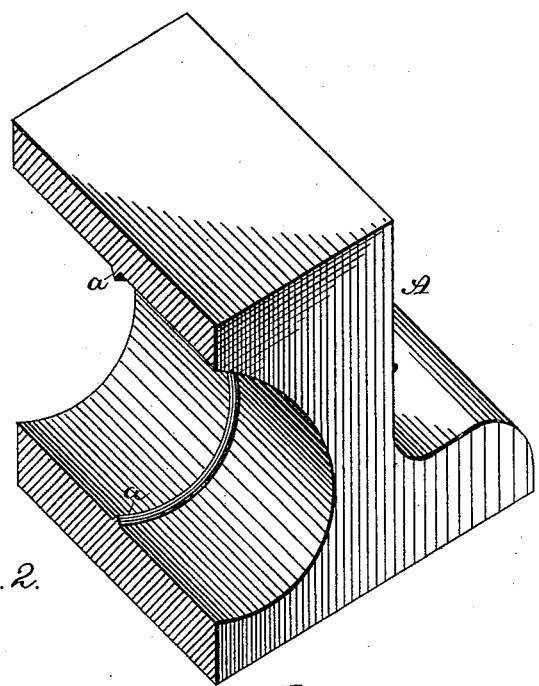
Fig. 2.
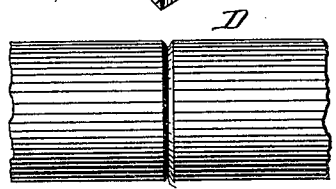
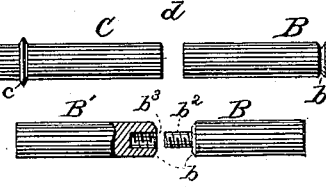
Witnesses:
J. W. Garner
W. S. D. Haines
Inventor:
N. A. Griffith
By F. W. Cleary,
His Attorney.

UNITED STATES PATENT OFFICE.

NATHANIEL A. GRIFFITH, OF AUSTIN, NEVADA.

JOURNAL-BEARING.

SPECIFICATION forming part of Letters Patent No. 258,413, dated May 23, 1882.

Application filed March 27, 1882. (No model.)

*To all whom it may concern:*

Be it known that I, NATHANIEL A. GRIFFITH, of Austin, in the county of Lander and State of Nevada, have invented certain new and useful Improvements in Journal-Bearings; and I do hereby declare the following to be a full, clear, and exact description of the invention, such as will enable others skilled in the art to which it pertains to make and use the same.

My invention relates to journal-bearings, the object being to provide a bearing for use with the journals of cars, wagons, or other vehicles or stationary machinery, which will reduce the friction to the minimum, and be adapted to allow the journal to run easily and without any liability of displacement of the anti-friction devices.

The invention consists in the combination, with a journal and box, of two series of anti-friction rollers interposed between the latter and secured in position against endwise displacement by rib-and-groove connections with the journal and box.

In the drawings, Figure 1 represents a vertical section of a journal-box with a journal or shaft and anti-friction rollers constructed and arranged in accordance with my invention; and Fig. 2 represents the parts detached, the box being shown in section.

A represents a journal-box provided interiorly at a central point with an annular rib or flange, $a$.

B represents a series of anti-friction rollers, adapted to bear against the inner side of the box A, and each provided with an annular groove, $b$, which register with and are adapted to travel upon the rib $a$ of the box.

C represents a second series of anti-friction rollers, each of which is provided with an annular rib or flange, $c$, adapted to register with the grooves $b$ of the rollers B, and with an annular groove, $d$, of the shaft or journal D.

The journal-bearing thus formed will be comparatively free from friction, and the rollers will be held securely against displacement by their flanges and grooves and those of the shaft and box.

It will be apparent that any desired number of rollers may be employed, the number depending upon their size and the space between the shaft and box.

It is not essential that the flanges and grooves should be arranged precisely as illustrated in the drawings, as they may be reversed, if desired—that is to say, the interior of the box might be grooved instead of flanged, and the adjacent series of rollers flanged, the other series grooved, and the shaft flanged; or two or more flanges and grooves may be formed instead of a single one on the box, shaft, and rollers.

In Fig. 2 is represented a roller formed in two parts, one of said parts being provided with a screw-threaded projection, $b^2$, which enters a female screw, $b^3$, of the other part of the roller. This construction is necessary for the final roller of the series, in order to admit of its insertion and the completion of the bearing, the parts or sections being inserted one from each side of the box.

Having fully described my invention, what I claim as new, and desire to secure by Letters Patent, is—

1. In a journal-bearing, the combination, with the journal box and shaft, of an outer and an inner series of anti-friction rollers secured together and to the box and shaft by rib-and-groove engagement, substantially as set forth.

2. In a journal-bearing, the combination, with a journal-box provided with an interior annular flange and a shaft provided with an annular groove, of a series of anti-friction rollers provided with annular grooves adapted to the rib of the box, and a second series of anti-friction rollers provided with annular flanges adapted to the groove of the shaft and those of the outer series of rollers, substantially as set forth.

3. In a journal-bearing, the combination, with the box and shaft, of two series of anti-friction rollers, all of said parts being connected by tongue-and-groove connections, and one of said rollers being formed in two sections connected by a male and female screw connection, substantially as set forth.

In testimony whereof I have signed this specification in the presence of two subscribing witnesses.

NATHANIEL ALVIN GRIFFITH.

Witnesses:
FRED. VON NORDECK,
J. A. MILLER.